United States Patent [19]

Uchida et al.

[11] Patent Number: 5,131,136
[45] Date of Patent: Jul. 21, 1992

[54] METHOD OF AND EQUIPMENT FOR EXCHANGING TOOLS OF MACHINE TOOL

[75] Inventors: Noboru Uchida, Numazi; Takao Date, Shizuoka, both of Japan; Shigetomo Sakamoto, Willowdale, Canada; Kazuhiko Kamitomai, Numazu, Japan

[73] Assignee: Toshiba Kikai Kabushiki Kaisha, Tokyo, Japan

[21] Appl. No.: 735,347

[22] Filed: Jul. 24, 1991

[30] Foreign Application Priority Data

Jul. 25, 1990 [JP] Japan .......................... 2-198304

[51] Int. Cl.⁵ .......................... B23Q 3/157
[52] U.S. Cl. .................. 483/5; 364/474.21; 483/43; 483/46
[58] Field of Search ............. 24/568, 26 A; 364/26 A

[56] References Cited

U.S. PATENT DOCUMENTS

| 4,459,737 | 7/1984 | Möri et al. ................ 29/568 |
| 4,575,918 | 3/1986 | Mattson .................... 29/568 |
| 4,893,399 | 1/1990 | Hammer ..................... 29/568 |
| 4,987,668 | 1/1991 | Roesch ..................... 29/568 |

FOREIGN PATENT DOCUMENTS

| 175305  | 3/1986  | European Pat. Off. ....... 29/568 |
| 45349   | 4/1981  | Japan ..................... 29/568 |
| 181535  | 10/1983 | Japan ..................... 29/568 |
| 213468  | 10/1985 | Japan ..................... 29/568 |
| 1407754 | 7/1988  | U.S.S.R. .................. 29/568 |
| 1325743 | 8/1973  | United Kingdom ............ 29/568 |

*Primary Examiner*—William Briggs
*Attorney, Agent, or Firm*—Cushman, Darby & Cushman

[57] ABSTRACT

An equipment of a machine tool for exchanging one tool attached to a main spindle into the other tool in a tool pot by memorizing a relative location between a terminated position of the cross rail and an elevator position of the tool pot of the tool-pot magazine mounted at one side of a gate-type column of the machine tool and being provided with corresponding detachable tool therein, calculating necessary movement distance of the tool pot with reference to the relative location, operating the tool-pot magazine by the calculated movement distance by a servo motor, and exchanging one tool attached to a main spindle into the other tool.

5 Claims, 8 Drawing Sheets

METHOD OF AND EQUIPMENT FOR EXCHANGING TOOLS OF MACHINE TOOL

BACKGROUND OF THE INVENTION

1. Field of the Invention

This invention relates to the tool exchange equipment of and the method of exchanging tools of the machine tool. To be detailed is pertinent with the tool exchange equipment of and the method of exchanging tools of the large-scaled machine tool which is equipped with the cross rail which is possible into the directions to go up-and-down.

2. Description of the Related Art

The conventional structure of the large-scaled tool machine has a cross rail capable of going up-and-down along a column, a spindle head movable on the cross rail, and a main spindle being detachable with a tool through the ram.

In the past, as one conventional tool exchange equipment (Prior equipment I) in the machine tool having such structure, it takes out a specific tool from the tool-pot magazine and makes this tool load at the height position of the cross rail with a elevator system. As the other tool exchange equipment (Prior equipment II), it has a tool-pot magazine to accommodate a plurality of tools in the cross rail.

However, there are the following problems in the above conventional equipment.

In the prior equipment I, since any of specific tools taken out from the tool-pot magazine should be positioned at the height position of the cross rail in order to be exchanged by an elevator system, it would take a time to exchange one tool into the other tool. Moreover, because it is necessary to institute an elevator system, there is a demerit that an organization is complicated, too.

By the prior equipment II which is of an organization providing with the tool-pot magazine on the cross rail, the weight which depends on the cross rail is too heavy to attain high accuracy of the movement and the positioning of the cross rail, so that the number of the tools in the tool-pot magazine may be limited. Especially, there are many heavy ones in the weight of the tool to use, too, at the large-scaled machine tool, the tool number which it is possible to accommodate is more limited.

SUMMARY OF THE INVENTION

Here, as for a purpose of this invention, it solves such conventional demerits. And then, An object of the present invention is to provide the tool exchange equipment of and the tool exchange method of the machine tool the structure of which compared with the one which uses a conventional elevator structure is simple and doesn't hang in tool exchange time, too, and moreover, the structure of which is never limited to the tool number which it is possible to accommodate in the tool-pot magazine, too.

Accordingly, the automatic tool change equipment of the present invention is of an equipment for exchanging tools of a machine tool having a horizontal member reciprocally going up-and-down along a column, a spindle head reciprocally moving along the horizontal member, and a spindle which is provided at the spindle head and is connectable with a tool, is constructed by: a tool-pot magazine including a moving path for travelling a plurality of tool pots each detachably keeping a tool therein, the moving path having an elevator path for moving the tool pots along the up-and-down movement of the horizontal member; an automatic tool change equipment, provided at the horizontal member, for exchanging the tool in corresponding tool pot into the tool attached to the main spindle; a drive device for operating the tool-pot magazine such that the tool pot is moved to a desired position; and control system including a memory for memorizing a relative location between a position of the horizontal member and a position of the tool pot on the elevator path for calculating the movement distance of the tool pot from a terminating position of the horizontal member with reference to the positions stored in the memory.

The equipment for exchanging tools of a machine tool may have a position detector for detecting a position of the horizontal member.

The drive device may be a servo motor. The drive device is controlled with based upon an index angle for each tool pot obtained by a formula; L/P, in which "P" is a distance between following two tool pots in the tool-pot magazine and "L" is a distance between a primary position of an up-and-down movement of a cross rail and an automatic tool change position.

In the invented equipment may be operated by the steps of: calculating a movement distance of a tool pot keeping a desired tool therein by a memory of a relative location between a terminated position of the horizontal member and a position of the tool pot keeping the desired tool therein, a tool-pot magazine, with a plurality of the tool pots, being disposed at a mounting portion of the machine tool; operating the tool-pot magazine to comply with the movement distance of the tool pot calculated; and changing the tool attached on the main spindle into the desired tool in the tool pot by an automatic tool change equipment.

In these steps, the calculating step may be activated under when a tool designate code for designating the desired tool in the tool-pot magazine is issued. Besides, the operating step further has a step of checking whether the tool-pot magazine is run up to the movement distance calculated in the calculated step.

Therefore, in the present equipment, the designated tool may be positioned at the corresponding position of the horizontal member without an elevator system as employed in the conventional equipment, so that the number of tools kept in corresponding tool pots shall not be limited.

DETAILED DESCRIPTION OF THE PREFERRED EMBODIMENT(S)

The following is the explanation of a preferred embodiment of the invention with reference to some drawings.

Figure 1:
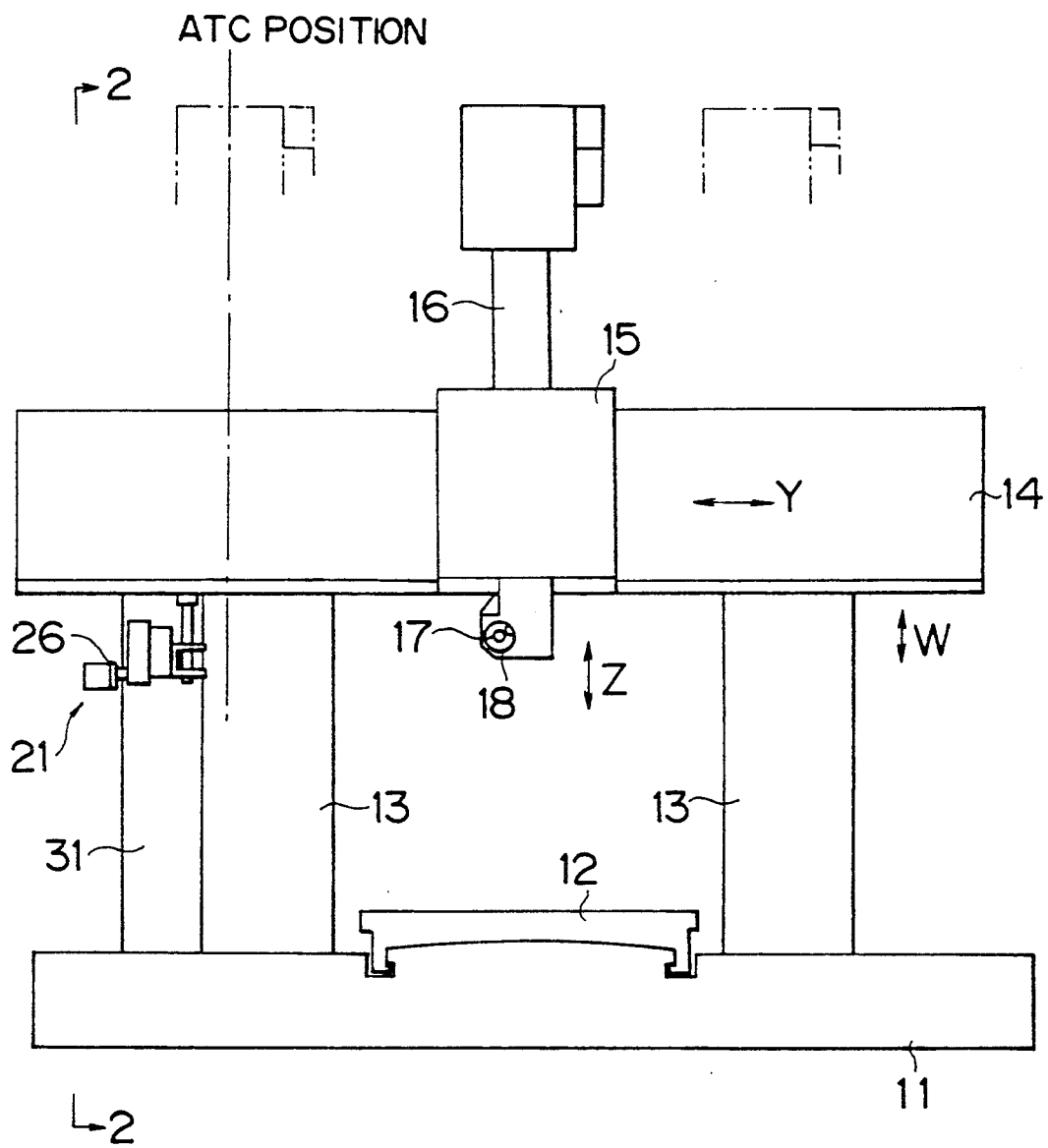
FIG. 1 is a front view of one embodiment in the present invention.
Figure 2:
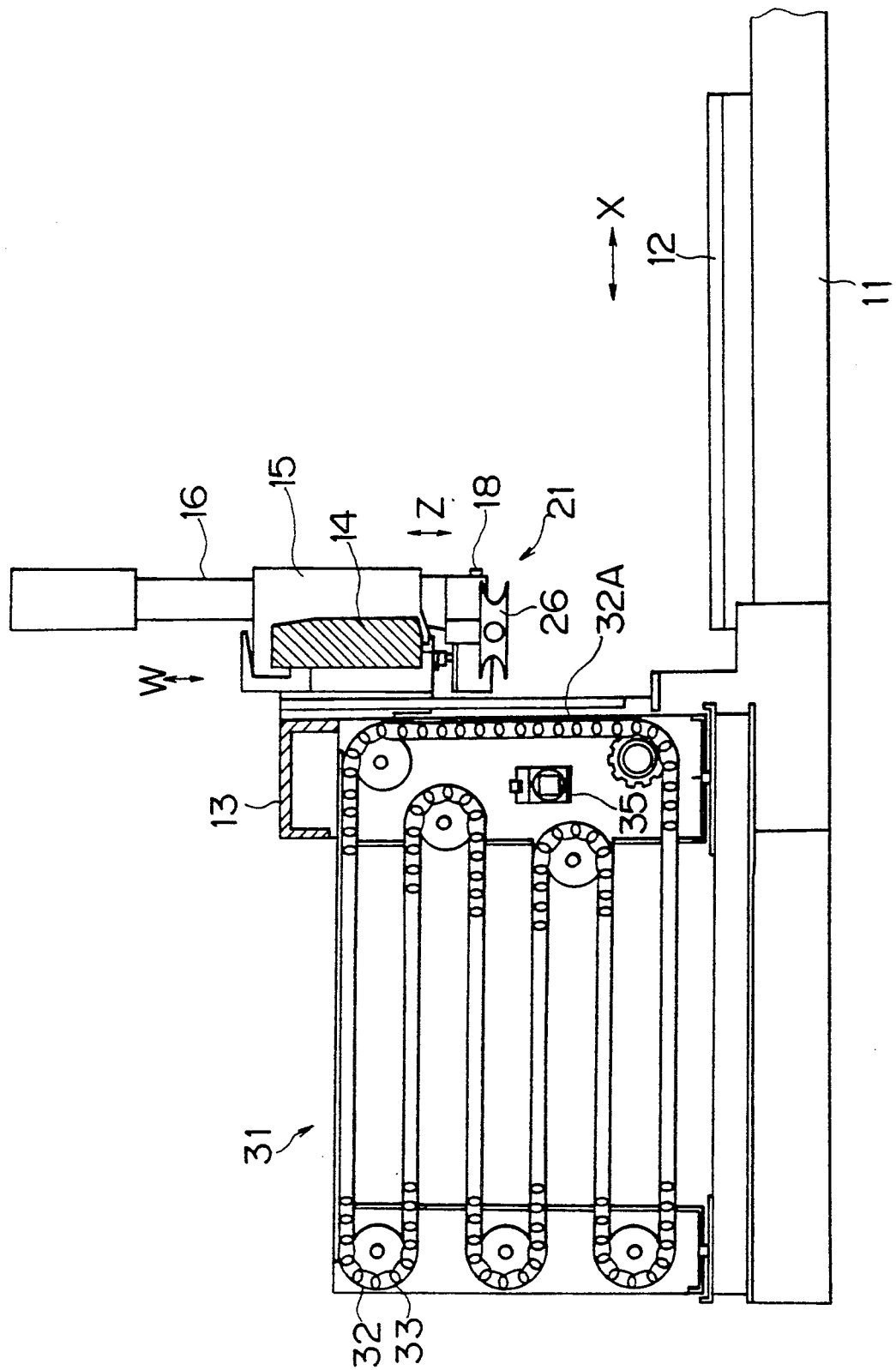
FIG. 2 is the 2—2 line sectional view of FIG. 1.

FIG. 1 shows the front view of a five-side machine tool according to the embodiment. FIG. 2 shows the 2—2 line sectional view in FIG. 1. In these Figures, denoted by 11 is a base. There are, on the base 11, a table 12 capable of reciprocally moving into both forward and backward directions (X-axis direction) and a gate-type column 13 which stands over the table 12. The gate-type column 13 is provided with a cross rail 14 reciprocally moving into both upward and downward directions (W-axis direction).

A spindle head 15 is provided on the cross rail 14 so as to reciprocally move into both right and left directions (Y-axis direction). The spindle head 15 has a ram 16 capable of reciprocally moving into both upward and downward directions (Z-axis direction). A lower end portion of the ram 16 is provided with a main spindle 17 axially intersecting with Y and Z axes. The main spindle 17 is detachably provided with tools 18 at its forwarded end portion.

An automatic tool change equipment 21 is disposed at a position where the spindle head 15 is placed at the automatic tool change (ATC) position as shown in FIG. 1, that is, where a tool 18 already attached to the main spindle 17 is exchanged with a designated tool. At an opposite side of the automatic tool change equipment 21, a tool-pot magazine 31 which may enclose a plurality of tools thereinside is mounted.

The tool-pot magazine 31 is constructed with an endless and rotatable chain 32, the front side of which goes parallel to the moving direction of the cross rail 14 and is straightly extended through out the stroke range of the cross rail 14, and the back side of which is snaked and a plurality of tool pots 33 horizontally provided on the chain 32 at every certain distance. In the following descriptions, the chain 32 should mean a moving path, and especially, the part of the chain 32 along with the up-and-down movement of cross rail 14 should mean an elevator path 32A. Incidentally, a tool not shown is positioned inside of each tool pot 33 in a removable state.

The tool-pot magazine 31 is driven by a servo motor 35 as a drive device, so that the desired tool pot is selectively shifted. The servo motor 35 has a function to control the desired tool pot based upon a predetermined index angle. The index angle for each tool pot may be obtained by the formula; L/P, in which "P" is a distance between following two tool pots 33 in the too-pot magazine 31 and "L" is a distance between a primary position of the up-and-down movement of cross rail 14 and ATC position.

Figure 3:
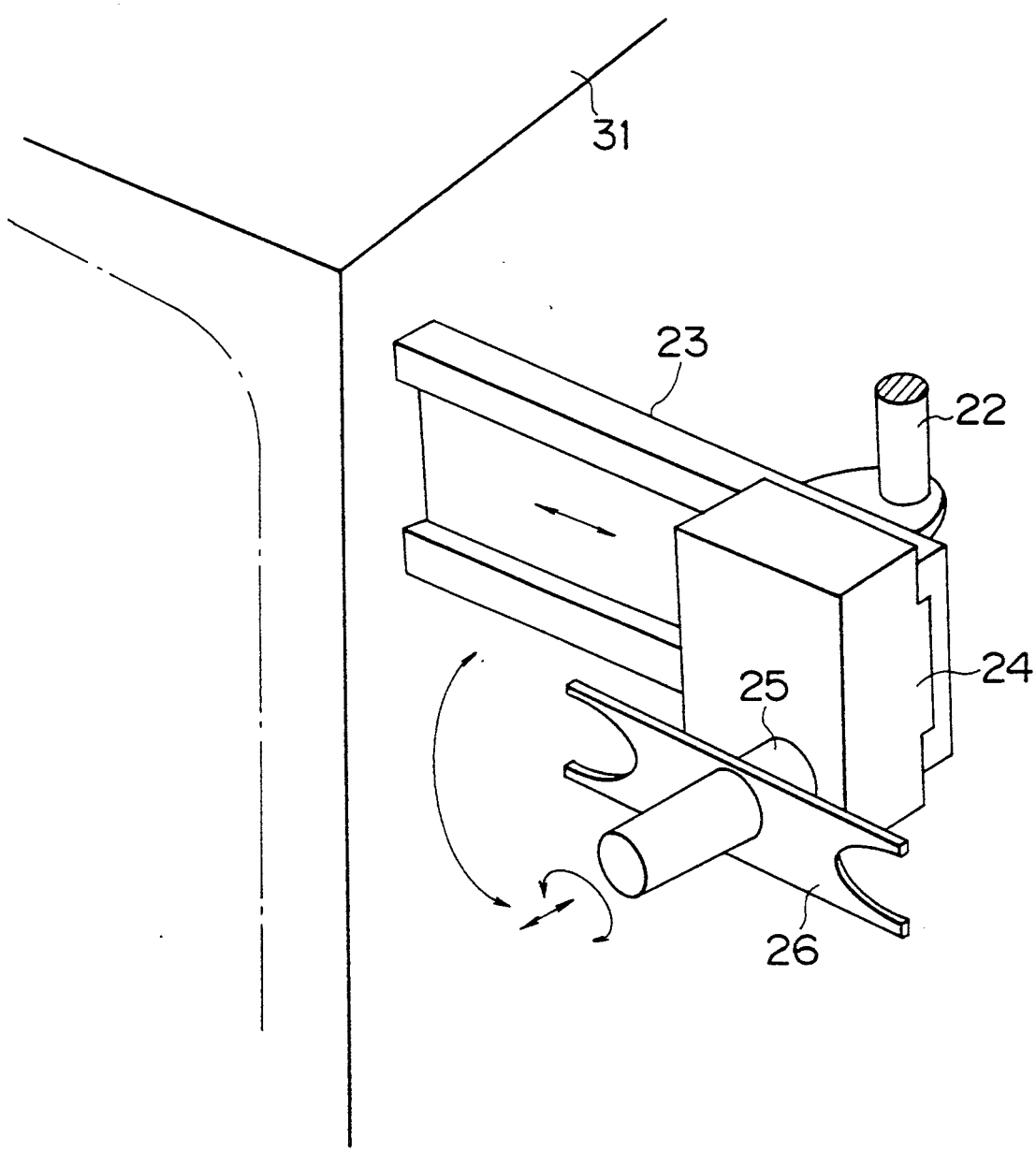
FIG. 3 is the perspective view which shows the schematic representation of the tool change equipment.

The automatic tool change equipment 21 is consisted, as shown in FIG. 3, with a guide plate 23 which turns around a vertical axle 22 provided on a lower side of the cross rail 14, a slider 24 which slides to the direction perpendicular to the vertical axle 22, and a change arm 26 which turns around a horizontal axle 25 of the slider 24. Incidentally, each moving mechanism of the mentioned automatic tool change equipment 21 is omitted to be shown in the drawing.

The following is the explanation how the tool exchanging may be done by the automatic tool change equipment 21. At the first stage, a designated tool in the corresponding tool-pot magazine 31 is shifted to the predetermined position with reference to the automatic tool change equipment 21.

(A) The slider 24 is moved along the guide plate 23 toward the tool magazine 31 to hold the designated tool 18A, desired to use, with one end claw of the change arm 26.

(B) The horizontal axle 25 is advanced so that the designated tool 18A held by the one end claw is pulled out from the tool-pot magazine 31.

(C) The slider 24 is reversed along the guide board 23 so as to make the designated tool 18A apart from the tool-pot magazine 31.

(D) The vertical axle 22 is turned anticlockwise around its axis at an angle of 90 degrees.

(E) The horizontal axle 25 is returned.

(F) The tool 18 which was previously attached to the main spindle 17 of the ram 16 is shifted to the ATC position so as to be caught by the other end claw of the change arm 26.

(G) The horizontal axle 25 is advanced so that the tool is pulled out from the main spindle 17.

(H) The horizontal axle 25 is turned around its axis at an angle of 180 degrees.

(I) The horizontal axle 25 is returned and the designated tool 18A is attached to the main spindle 17.

(J) The ram 16 is moved to apart from the automatic tool change equipment 21, so that the designated tool 18A attached to the main spindle 17 may be released from the change arm 26.

(K) The vertical axle 22 is turned clockwise around its axis at an angle of 90 degrees.

(L) The slider 24 is moved toward the tool magazine 31 along the guide plate 23.

(M) The horizontal axle 25 is returned, so that the tool 18 is returned back into the tool magazine 31.

(N) The slider 24 is moved along the guide plate 23 so as to apart from the tool magazine 31 and to revert to its primary position.

Figure 5:
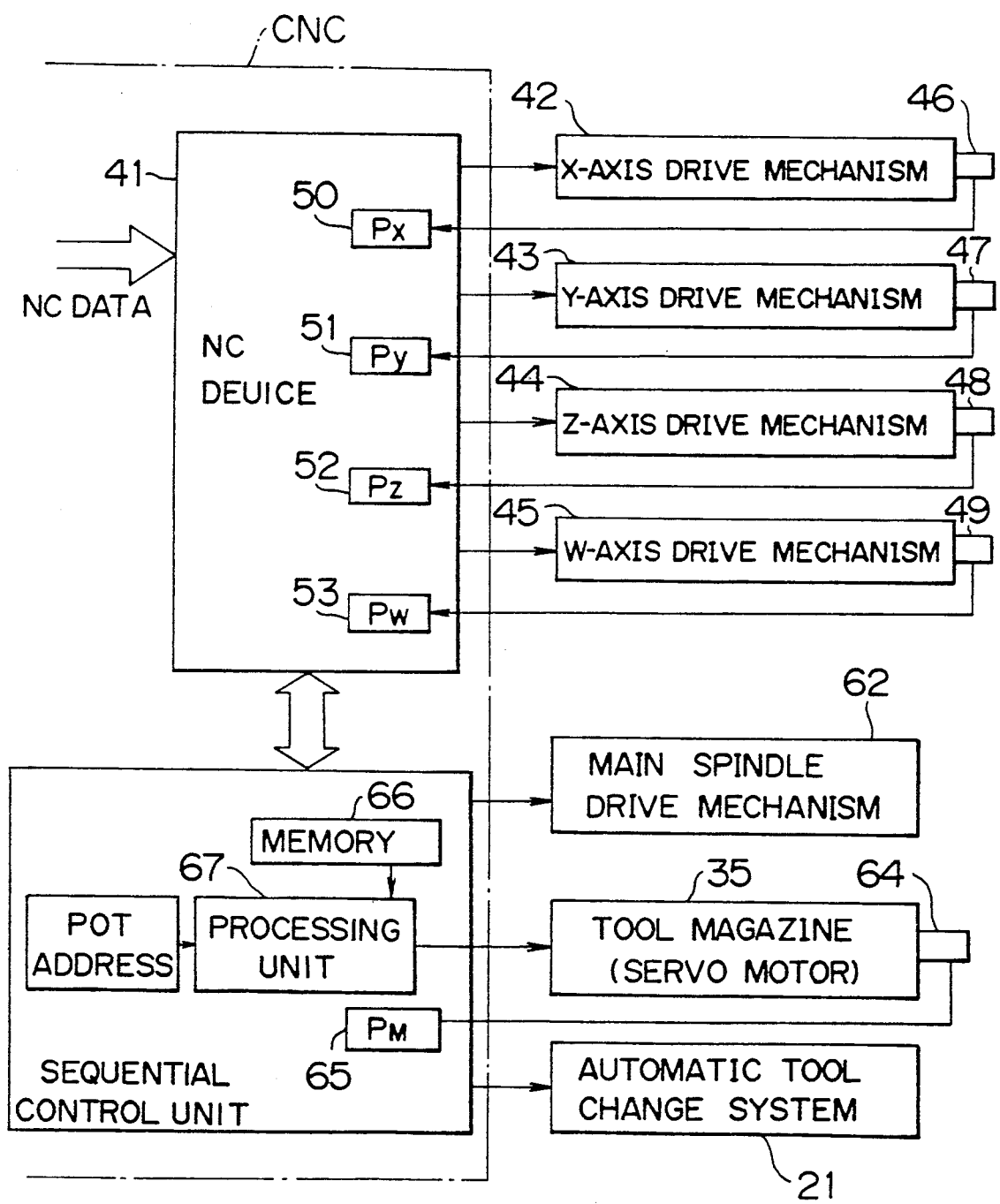
FIG. 5 is the block diagram which shows circuit design.

FIG. 5 shows a CNC circuit to control the five-side machine tool. The CNC circuit is consisted with a numerical control device 41 to be input with NC data and a sequential control unit 61.

The NC device 41 has a X-axis drive mechanism 42 for moving the table 12 into X-axis direction, a Y-axis drive mechanism 43 for moving the main spindle 15 into Y-axis direction, a Z-axis drive mechanism 44 for going up-and-down the ram 16 into Z-axis direction, and a W-axis drive mechanism 45 for going up-and-down the cross rail 14 into W-axis direction, and further has registers 50 to 53 for updating position data Px, Py, Pz, Pw issued from position detector 46 to 49, respectively. The NC device has a function to control respective drive mechanism 42 to 45, and also has a function to issue data to the sequential control unit 61 for controlling the main spindle 17 and for tool change.

The sequential control unit 61 is connected with a main spindle drive mechanism 62 for driving the main spindle 17, a servo motor 35 of the tool-pot magazine 31, and the automatic tool change equipment 21. This unit 61 further has a register 65 for storing a position data $P_M$ issued from a position detector 64 connected with the servo motor 35, a memory 66 for memorizing a relative location between, for example a terminated position of the cross rail 14 and the position of the tool pot on the elevator path 32A in the tool-pot magazine 31, a processing unit 67 for processing the movement distance of the tool pot, and a pot address 68 for memorizing each address and code of tool pots in the tool-pot magazine 31. The displacement value of the tool pot may be estimated in the processing unit 67 by the absolute position of the tool pot memorized in the pot address 68 and the position data memorized in the memory 66. The process in the sequential control unit 61 based on the issued data from the NC device 41 is shown by a flow chart in FIG. 6. Consequently, a control system is consisted with the NC device 41 and the sequential control unit 61. Under the system, the designated tool 18A is shifted into the relative position with the automatic tool change equipment 21 by the operation of the tool-pot magazine 31 with reference to the positioning data Pw of the cross rail 14 detected by the position detector 49. The tool 18 attached to the main spindle 17 is then exchanged with the designated tool 18A by the automatic tool change equipment 21.

The operation of this embodiment will hereunder be described.

NC device 41 may control the main spindle drive mechanism 62 through the sequential control unit 61 based on the NC data and also may move the table 12, the main spindle 15, the ram 16 and the cross rail 14 with controlling each drive mechanism 42 to 45. An object set on the table 12 is then automatically processed. The respective positioning data Px, Py, Pz, Pw of the table 12, the main spindle 15, the ram 16 and the cross rail 14 are detected by the position detectors 46 to 49 and stored in the registers 50 to 53.

Figure 6:
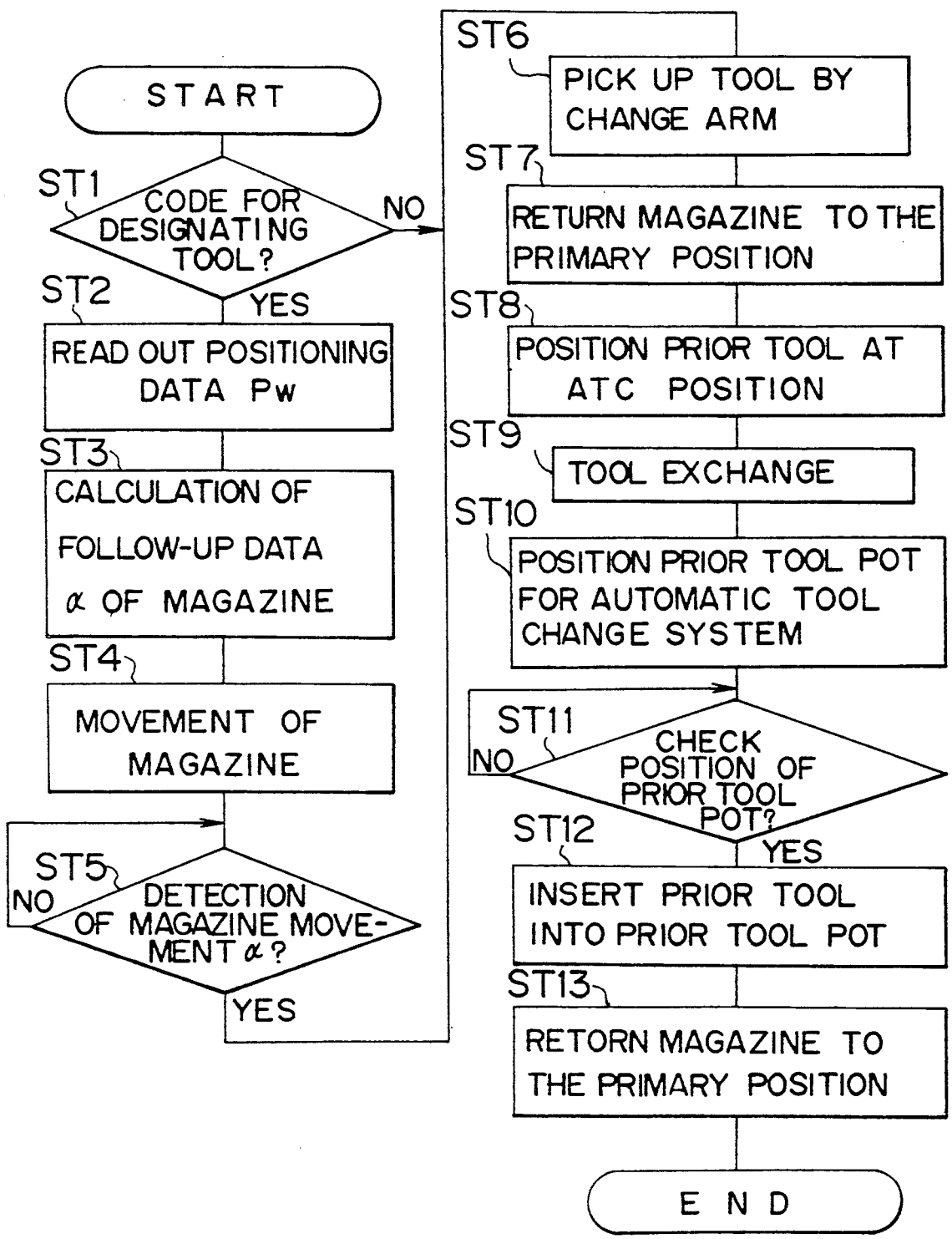
FIG. 6 is the flow chart which shows a process in a tool exchange.

When the tool-designate code is issued from the NC device 41 to the sequential control unit 61, the unit 61 execute the process shown by the flow chart in FIG. 6. When the tool-designate code is issued (ST1), the positioning date Pw of the cross rail 14 is read from the register 53 (ST2). The memory 66 stored the positioning data Pw as a particular point on the elevator path 32A of the tool-pot magazine 32. At the following step (ST3), the follow-up data o of the magazine 31 is calculated, that is, the movement distance of the tool-pot magazine, by which the designated tool 18A is travelled to the corresponding position for the automatic tool change equipment 21, is calculated based upon both positions of the designated tool 18A and the positioning data Pw of the cross rail 14. In this process, a absolute position of the tool pot having the designated tool 18A is issued from the pot address 68. The movement distance of the tool pot may be calculated by the processing unit 67 with the issued absolute position of the tool pot and the exchange position of the positioning data Pw stored in the memory 66.

In the next step (ST4), the tool-pot magazine 31 is travelled. After the servo motor 35 is in the operation, the follow-up data α of the magazine 31 is checked based upon the positioning data $P_M$ from the position detector 64 (ST5). If the magazine 31 is moved by the follow-up data α, the designated tool 18A is pulled out from the magazine 31 by the change arm 26 of the automatic tool change equipment 21 (ST6). All of the above processes are shown by FIGS. 4(A) to 4(E).

Figure 4A:
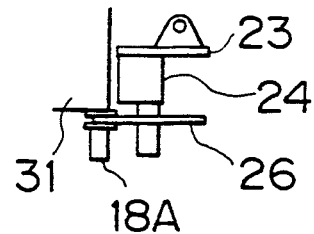
FIGS. 4(A) to 4(N) are the schematic illustrations which show the operation of the tool change equipment.
Figure 4B:
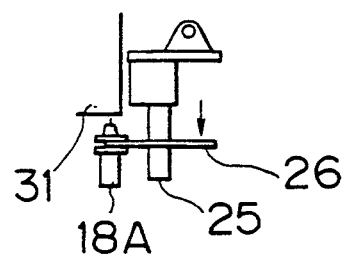
Figure 4C:
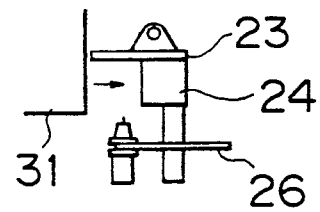
Figure 4D:
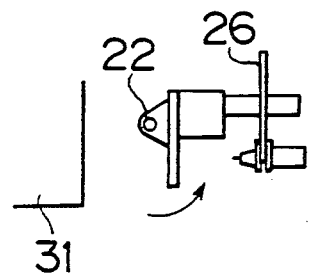
Figure 4E:
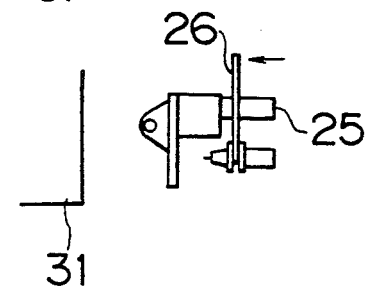
Figure 4F:
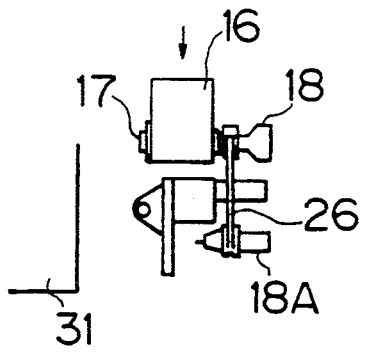
Figure 4G:
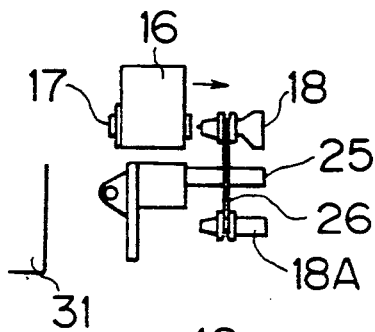
Figure 4H:
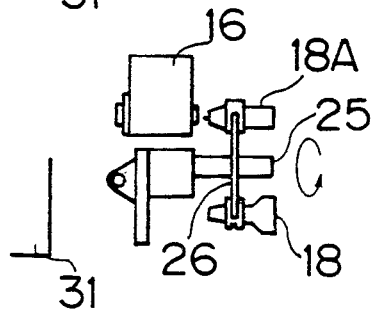
Figure 4I:
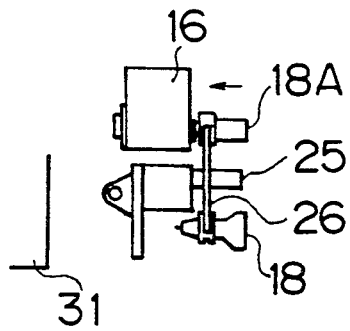
Figure 4J:
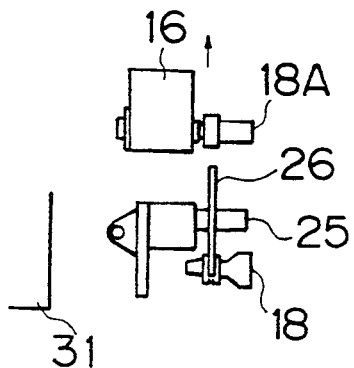
Figure 4K:
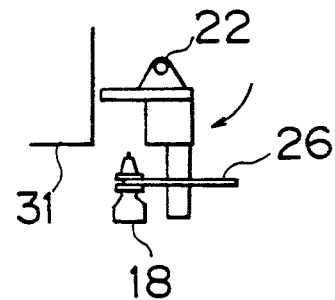
Figure 4L:
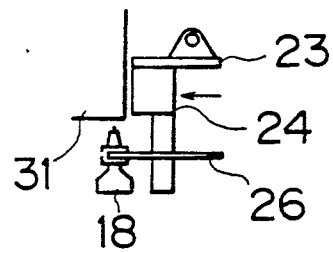
Figure 4M:
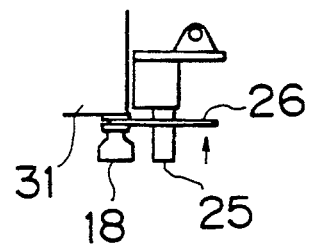
Figure 4N:
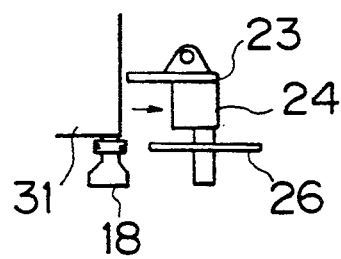

The magazine 31 is returned to its primary position (ST7). The tool 18 attached to the main spindle 17 is set at the ATC position (ST8). This motion is shown in FIG. 4(F). The tool 18 is exchanged (ST9), that is shown by FIGS. 4(G) to 4(J), the tool pot for tool 18 is set at the corresponding position of the automatic tool change equipment 21.

When the tool pot for the tool 18 is correctly set, the tool 18 is inserted into corresponding tool pot in the magazine 31 as shown by FIGS. 4(K) to 4(N). The tool pot magazine 31 is returned to the primary position (ST13). Accordingly, since the automatic tool change equipment 21 is provided on the cross rail 14 and the tool 18 or 18A in the tool-pot magazine 31 may be set at the corresponding position with the automatic tool change equipment 21, that is the tool pot magazine 31 may follow up the position of the cross rail 14, the problems in the art are solved.

The merit of the present invention is that no elevator system is needed as in the conventional type, so that the necessary time for exchanging of tool may be minimized and the construction is also simplified. Besides, the tool-pot magazine is not put on the cross rail, it will be allowed to collect more tools in the tool-pot magazine than ever.

In the above embodiment, the tool 18 or 18A is always kept in corresponding tool pot, but it may be possible that the tool 18 or 18A is inserted into anther vacant tool pot occasionally.

The automatic tool change equipment 21 explained above may not be limited to one type but another type which can exchange the tool 18 with the designated tool 18A.

The drive device 35 of the tool-pot magazine may not limited to the servo motor but another device which can control the movement of the tool pot-magazine.

The position of the tool-pot magazine is not necessary to be mounted at one side of the column but may be placed at other area free from cross rail and so on.

Accordingly, the whole construction may be simple compared with that of the conventional type. The necessary time for exchanging of tools may also be minimized. The number of tools in the pot magazine may not be limited.

What is claimed is:

1. An equipment for exchanging tools of a machine tool having a horizontal member reciprocally going up-and-down along a column, a spindle head reciprocally moving along the horizontal member, and a spindle which is provided at the spindle head and is connectable with a tool, comprising:

a tool-pot magazine including a moving path for travelling a plurality of tool pots each detachably keeping a tool therein, the moving path having an elevator path for moving the tool pots along the up-and-down movement of the horizontal member;

an automatic tool change equipment, provided at the horizontal member, for exchanging the tool in corresponding tool pot into the tool attached to the main spindle;

a drive device for operating said tool-pot magazine such that the tool pot is moved to a desired position; and control means including a memory for memorizing a relative location between a position of the horizontal member and a position of the tool pot on the elevator path for calculating the movement distance of the tool pot from a terminating position of the horizontal member with reference to the positions stored in the memory.

2. An equipment for exchanging tools of a machine tool according to claim 1 further comprising a position detector for detecting a position of the horizontal member.

3. An equipment for exchanging tools of a machine tool according to claim 1, wherein said drive device is a servo motor.

4. An equipment for exchanging tools of a machine tool according to claim 1, wherein said drive device is controlled with based upon an index angle for each tool pot obtained by a formula; L/P, in which "P" is a distance between following two tool pots in the tool-pot magazine and "L" is a distance between a primary position of an up-and-down movement of a cross rail and an automatic tool change position.

5. A method of exchanging tools of a machine tool having a horizontal member reciprocally going up-and-down along a column, a spindle head reciprocally moving along the horizontal member, and a spindle which is provided at the spindle head and is connectable with a tool, comprising the steps of:

calculating a movement distance of a tool pot keeping a desired tool therein by a memory of a relative location between a terminated position of the horizontal member and a position of the tool pot keeping the desired tool therein, a tool-pot magazine, with a plurality of the tool pots, being disposed at a mounting portion of the machine tool;

operating the tool-pot magazine to comply with the movement distance of the tool pot calculated; and changing the tool attached on the main spindle into the desired tool in the tool pot by an automatic tool change equipment.

* * * * *